United States Patent
Jarvis (10) Patent No.: US 8,055,865 B2
(45) Date of Patent: Nov. 8, 2011

(54) MANAGING WRITE REQUESTS TO DATA SETS IN A PRIMARY VOLUME SUBJECT TO BEING COPIED TO A SECONDARY VOLUME

(75) Inventor: Thomas Charles Jarvis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 11/834,626

(22) Filed: Aug. 6, 2007

(65) Prior Publication Data

US 2009/0043979 A1 Feb. 12, 2009

(51) Int. Cl.
*G06F 12/00* (2006.01)
(52) U.S. Cl. .. 711/162; 711/161; 711/112; 711/E12.019
(58) Field of Classification Search ............................ None
See application file for complete search history.

(56) References Cited

U.S. PATENT DOCUMENTS

| | | | |
|---|---|---|---|
| 4,760,519 A | 7/1988 | Papworth et al. | |
| 5,418,936 A | 5/1995 | Rodriguez et al. | |
| 6,381,677 B1 | 4/2002 | Beardsley et al. | |
| 6,704,837 B2 | 3/2004 | Beardsley et al. | |
| 7,133,986 B2 | 11/2006 | Spear et al. | |
| 7,188,222 B2 | 3/2007 | Micka et al. | |
| 2004/0068633 A1 | 4/2004 | Engelahardt | |
| 2004/0260972 A1* | 12/2004 | Ji et al. ............................ | 714/11 |
| 2005/0132256 A1* | 6/2005 | Watanabe et al. ............... | 714/42 |

\* cited by examiner

*Primary Examiner* — Reginald Bragdon
*Assistant Examiner* — Thanh Vo
(74) *Attorney, Agent, or Firm* — David W. Victor; Konrad Raynes & Victor LLP.

(57) ABSTRACT

Provided are a method, system, and article of manufacture for managing write requests to data sets in a primary volume subject to being copied to a secondary volume. Information indicating data sets to copy from a primary storage to a secondary storage is generated. A write request is received to write data to a target data set indicated in the information to copy from the primary storage to the secondary storage. A determination is made as to whether the write request is part of a sequential write access. The target data set and sequential data sets following the target data set are copied from the primary storage to the secondary storage. The write request to write the data to the primary storage is executed in response to receiving acknowledgment that the target data set was copied to the secondary storage.

19 Claims, 5 Drawing Sheets

MANAGING WRITE REQUESTS TO DATA SETS IN A PRIMARY VOLUME SUBJECT TO BEING COPIED TO A SECONDARY VOLUME

BACKGROUND OF THE INVENTION

1. Field of the Invention

The present invention relates to a method, system, and article of manufacture for managing write requests to data sets in a primary volume subject to being copied to a secondary volume.

2. Description of the Related Art

Disaster recovery systems typically address two types of failures, a sudden catastrophic failure at a single point-in-time or data loss over a period of time. In both types of disasters, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices.

In many application programs, such as database systems, certain writes cannot occur unless a previous write occurred; otherwise the data integrity would be jeopardized. Such a data write whose integrity is dependent on the occurrence of previous data writes is known as a dependent write. Volumes in the primary and secondary storages are consistent when all writes have been transferred in their logical order, i.e., all dependent writes transferred first before the writes dependent thereon. A consistency group is a collection of updates to the primary volumes such that dependent writes are secured in a consistent manner. The consistency time is the latest time to which the system guarantees that updates to the secondary volumes are consistent. The consistency group includes all dependent writes as of a point-in-time written to the remote or secondary site in the order in which they were written to the primary devices. The consistency group further has a consistency time for all data writes in a consistency group having a time stamp equal or earlier than the consistency time stamp. Consistency groups maintain data consistency across volumes and storage devices. Thus, when data is recovered from the secondary volumes, the recovered data will be consistent as of the point-in-time of the consistency group.

A storage controller will form a consistency group of data in a primary volume to mirror to a secondary volume by quiescing writes and indicating the data in the consistency group to mirror in an out-of-synch bitmap. The storage controller will then start copying data in a primary volume indicated in the out-of-synch bitmap to a secondary volume and at the same time process write requests to the primary volume. Writes executed against the primary volume are recorded in a change recording bitmap, but not copied to the secondary volume until the next consistency group is formed. If a write request is directed to a target track indicated in the out-of-synch bitmap as not yet copied to the secondary volume, then the write request will be delayed until the current version of the track in the primary volume or cache is copied over to the secondary volume. After the current version of the track in the primary volume is copied, the write request may proceed to update the track. In this way, writes are delayed to allow data in the consistency group to be copied to a remote site in a consistent manner.

There is a need in the art for improved techniques for handling write requests to data sets that are in a consistency group that are in the process of being mirrored to a secondary volume.

SUMMARY

Provided are a method, system, and article of manufacture for managing write requests to data sets in a primary volume subject to being copied to a secondary volume. Information indicating data sets to copy from a primary storage to a secondary storage is generated. A write request is received to write data to a target data set indicated in the information to copy from the primary storage to the secondary storage. A determination is made as to whether the write request is part of a sequential write access. The target data set and sequential data sets following the target data set are copied from the primary storage to the secondary storage. The write request to write the data to the primary storage is executed in response to receiving acknowledgment that the target data set was copied to the secondary storage.

DETAILED DESCRIPTION

Figure 1:
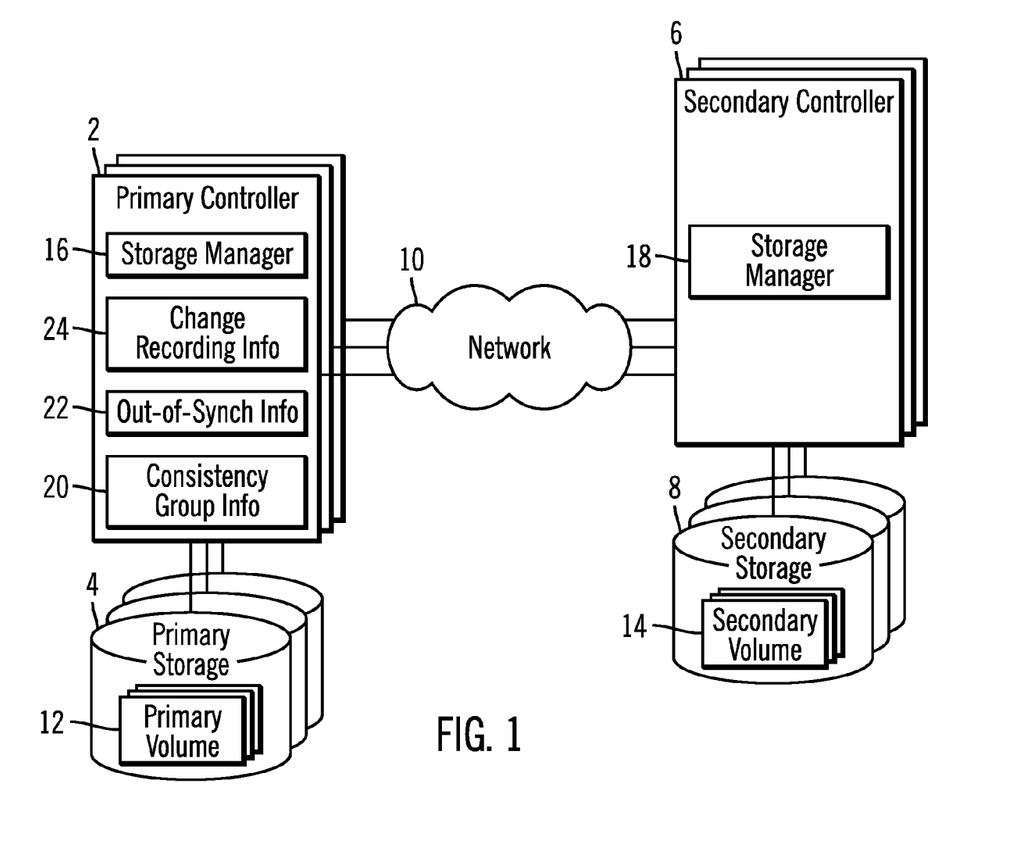
FIG. 1 illustrates an embodiment of a network computing environment.

FIG. 1 illustrates an embodiment of a network computing environment. One or more primary controllers 2 each manage Input/Output (I/O) access to a primary storage 4 and each secondary controller 6 manages I/O access to a secondary storage 8. The primary controllers 2 may be associated with corresponding secondary controllers 6 and communicate over a network 10. Each primary controller 2 mirrors writes to a primary volume 12 in the coupled primary storage 4 to a corresponding secondary volume 14 in the secondary storage 8 managed by the corresponding secondary controller 6.

In one embodiment, the primary controllers 2 may be managed so that writes to any primary volume 12 are copied to the corresponding secondary volume 14 in a consistency group, that includes data consistent as of a point-in-time. In this way, dependent writes to the primary volumes 12 are mirrored to their corresponding secondary volumes 14 in the order in which they are written to the primary volume. Later dependent writes to a primary volume 12 in a consistency group are not copied to the corresponding secondary volume 14 before earlier writes are copied to the corresponding secondary volume 14.

In a further embodiment, the data across primary controllers 2 may be managed in a single consistency groups, so that the primary controllers 2 transfer data to the secondary volumes 14 in a same consistency group having a same consistency group point-in-time. In such an embodiment where primary controllers 2 are managed in a single consistency group, a separate storage management system or one master primary controller may be used to coordinate the primary controllers 2 consistency group mirroring operations to maintain data copied from the primary storages 4 to the secondary storages 8 consistent as of a same point-in-time.

The network 10 may comprise a Storage Area Network (SAN), Local Area Network (LAN), Intranet, the Internet, Wide Area Network (WAN), peer-to-peer network, wireless network, arbitrated loop network, etc. The storages 4 and 8 may comprise a single storage device, such as a hard disk drive, Flash Memory, etc or an array of storage devices, such as a Just a Bunch of Disks (JBOD), Network Attached Storage (NAS), hard disk drive, Direct Access Storage Device (DASD), Redundant Array of Independent Disks (RAID) array, virtualization device, tape storage, flash memory, etc. The primary controllers 2 may comprise separate servers or multiple logical partitions (LPARs) or virtual processors implemented in a single system. In one embodiment, the primary 2 and secondary 6 controllers may comprise a server, an enterprise storage server, device controller (e.g., RAID controller), etc., that manages access to the storage 4, 8.

Each primary controller 2 includes a storage manager 16 to manage read and write requests to the primary storage 12 and the mirroring of writes to the primary volumes 12 in a consistency group to the corresponding secondary volumes 14. Each secondary controller 6 also includes a storage manager 18 to receive writes from the primary controller 2 to store in the secondary storage 8 and to manage read and write requests to the secondary storage 18.

In one embodiment, the storage manager 16 in each primary controller 2 maintains consistency group information 20 having information on every primary volume 12/secondary volume 14 and primary storage 4/secondary storage 6 pair included in one consistency group. For each consistency group, out-of-synch data information (OOS) 22 and change recording information 24 are maintained. The out-of-synch data information 22 may comprise a data structure, such as a bitmap, including a bit for each data set (e.g., track, block, or other storage unit) that the primary controller 2 copies over to the corresponding remote secondary controller 6. The change recording information 24 may comprise a data structure, such as a bitmap, including a bit for each track to which an update is received while data in a consistency group is being mirrored to the secondary volume 14. The consistency group is formed by the storage manager 16 asynchronously copying all the data in the out-of-synch data information 22, which is consistent as of a point in time, to the corresponding secondary volume 14. After all the data indicated in the out-of-synch data information 22 is copied to the secondary volume 14 a new consistency group is formed by quiescing writes to the primary volume 12 and initializing the out-of-synch information 22 to the current change recording information 24. If the information 22 and 24 are in the form of bitmaps, then the change recording data bitmap may be set to the out-of-synch bitmap, which is then cleared to indicate no updates.

Figure 2:
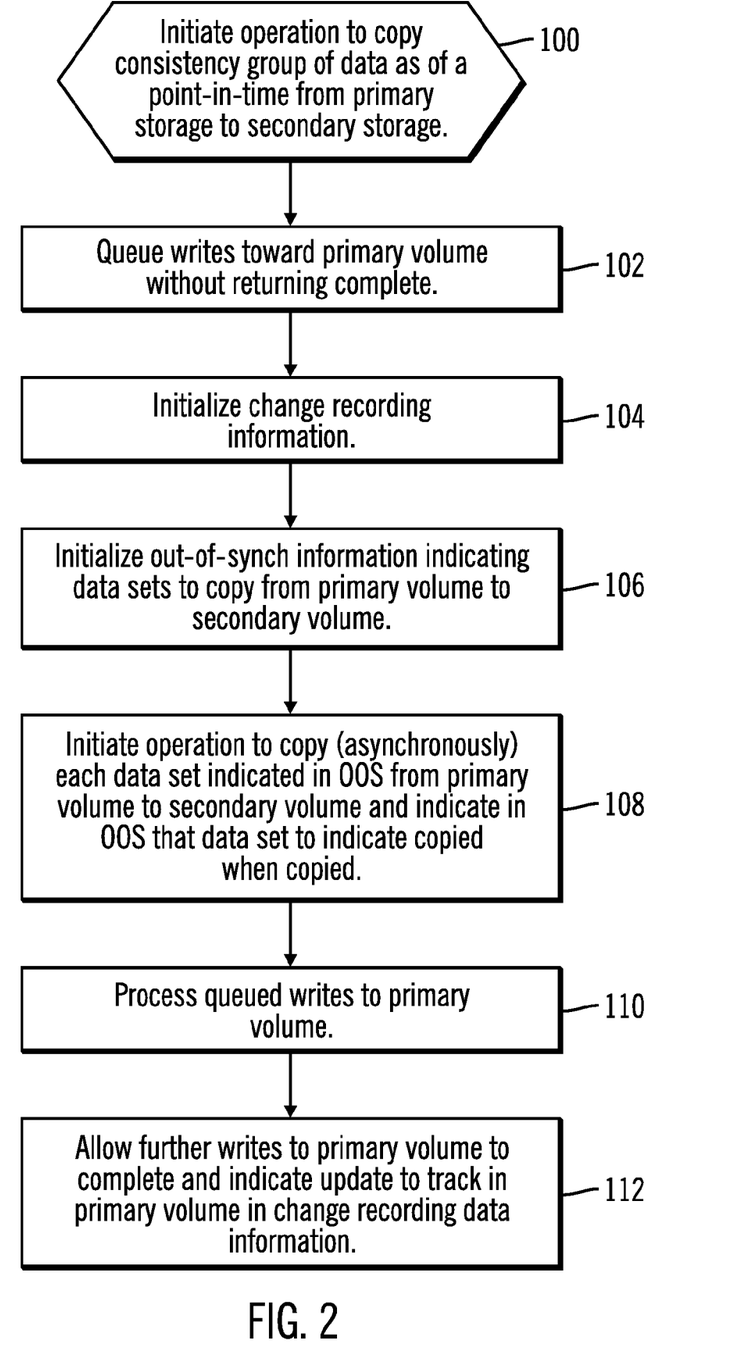
FIG. 2 illustrates an embodiment of operations to establish a consistency group of data sets in a primary volume to copy to a secondary volume.

FIG. 2 illustrates an embodiment of operations performed by the storage manager 16 in the primary controller 2 to copy a consistency group of data, consistent as of a point-in-time, from the primary volume 12 to the corresponding secondary volume 14. Upon initiating (at block 100) operations to copy a consistency group of data as of a point-in-time from a primary volume 12 to a corresponding secondary volume 14, the storage manager 16 queues (at block 102) received writes directed to the primary volume 12 to include in the consistency group without returning complete. The storage manager 16 initializes (at block 104) change recording information 24 and initializes (at block 106) out-of-synch information 22 indicating data sets, e.g., tracks, blocks, etc., to copy from the primary volume 12 to the secondary volume 14. In one embodiment, the out-of-synch data information 22 may be initialized by setting the out-of-synch data information 22 to be the current change recording information 24, and initializing the change recording information 24 to be a data structure indicating that no tracks in the primary volume 12 for which the consistency group is being formed have been updated.

The storage manager 16 initiates (at block 108) an operation to copy e.g., asynchronously copy, each data set (e.g., track, block, storage unit, etc.) indicated in the out-of-synch data information 22 for the primary volume 12 to the corresponding secondary volume 14 and then indicate in the out-of-synch data information 22 that the copied track was copied, which may involve setting the bit for the copied track to indicate that the data set was copied. In one embodiment, the storage manager 16 may copy data sets indicated in the out-of-synch data information 22 to copy according to the ordering of data sets in the out-of-synch data information 22, which may order tracks sequentially according to their data set addresses. After initiating the information 22 and 24, the storage manager 16 processes (at block 110) queued writes to the primary volume 12 and allows (at block 112) further writes to the primary volume 12 to proceed. Any data sets in the primary volume 12 updated by writes are indicated as updated in the change recording information 24 for the primary volume 12.

Figure 3:
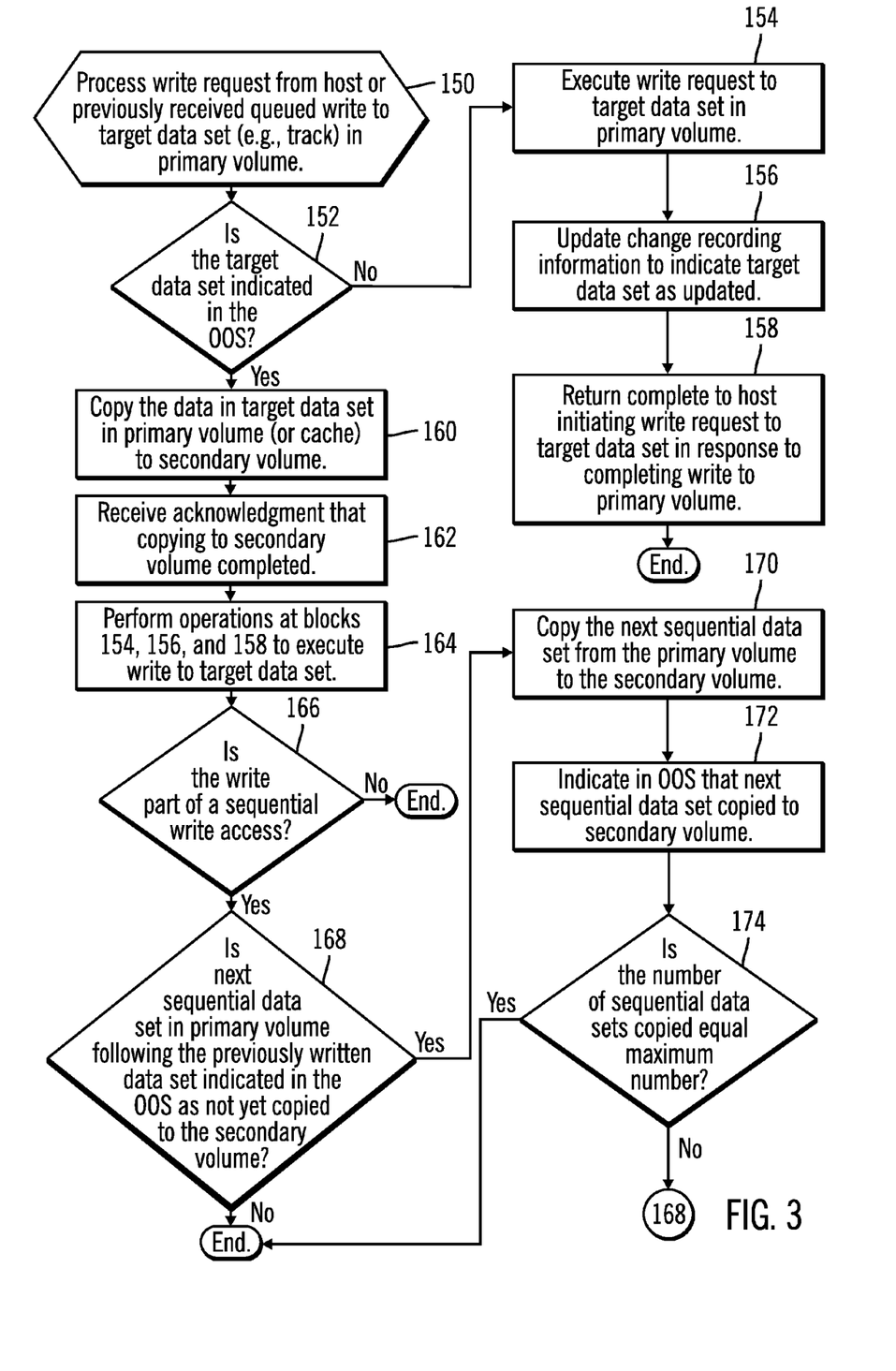
FIG. 3 illustrates an embodiment of operations to handle a write request while copying data in a consistency group to a secondary volume.

FIG. 3 illustrates an embodiment of operations performed by the storage manager 16 to process a write request to the primary volume 12. Upon processing (at block 150) a write request from a host or a previously received queued write to a target data set (e.g., track, block, etc,) in the primary volume 12, the storage manager 16 determines (at block 152) whether the target data set is indicated in the out-of-synch data information 22 as not yet copied. If not, then the storage manager 16 executes (at block 154) the write request to the target data set in the primary volume 12 and updates (at block 156) the change recording information 24 to indicate the target data set as updated. Upon completing the write to the primary volume 12, the storage manager 16 returns (at block 158) complete to the host initiating the write request to the target data set in response to completing the write to the primary volume 12. The write may be completed upon writing the data to a cache or non-volatile storage unit of the primary controller 2 before the write is applied to the primary storage 4. In one embodiment, acknowledgment of write complete may be returned to the host in response to updating the change recording bitmap, receiving confirmation that the write data was written to an intermediary site or completing the copying of the write to the secondary volume.

If (at block 152) the target data set is indicated in the out-of-synch data information 22 as not yet copied, then the storage manager 16 copies (at block 160) the target data set in the primary volume 12 (or a cache of the primary controller 2) to the corresponding secondary volume 14. The copied data comprises the version of the data set before the update was received. At block 162, the storage manager 16 receives acknowledgment that the target data set was successfully copied to the secondary volume 14. This acknowledgment may be returned in response to the data being written to a cache or non-volatile storage unit in the secondary controller 6 or being written to the secondary storage 8. In response to the acknowledgment that the copy completed, the storage manager 16 performs (at block 164) the operations at blocks 154, 156, and 158 to execute the write to the target data set at the primary volume 12, which involves updating the change recording information 24.

The storage manager determines (at block 166) whether the write is part of a sequential write access. This determination may be made using suitable algorithms known in the art that determine whether a specific write request is part of a sequential series of write requests based on a pattern of the addresses subject to recent write requests. If (at block 166) the write is not determined to be part of a series of writes to sequential addresses, then control ends. Otherwise, if (at block 166) the write is determined to be part of a series of writes to sequential addresses in the primary volume 12, then the storage manager 16 determines (at block 168) whether a next sequential data set in the primary volume 12 following the previously written data set (which may comprise the target data set or one of the following data sets) is indicated in the out-of-synch data information 22 as not yet copied to the secondary volume 14. A data set may follow another data set if their addresses are consecutive. If (at block 168) the next sequential data set is indicated in the out-of-synch data information 22 as not yet copied, then the storage manager 16 copies (at block 170) the next sequential data set from the primary volume 12 to the secondary volume 14 and indicates (at block 172) in the out-of-synch data information 22 that the next sequential data set is copied to the secondary volume 14, e.g., by turning the bit "off" indicating that data set or track does not need to be copied.

If (at block 174) the number of sequential data sets following the target data set copied equals a maximum number of sequential data sets to copy, which may comprise a predefined value, then control ends. Otherwise, if the maximum number of sequential data sets, e.g., tracks, following the target data set have not been copied, then control proceeds back to block 168 to consider copying the next sequential data set following the previously copied one.

With the described embodiments, if there is a write request to a target data set that has not yet been copied over to the secondary volume, then the primary controller when delaying the write in order to copy the current version of the data set, without the update, to the secondary volume may further copy a number of sequential data sets following the target data set if the write request is determined to be part of a series of writes to sequential addresses in the primary volume. If the write request is part of a series of sequential addresses, then there is a substantial likelihood that there will be further writes to sequential addresses in the primary volume. In such case, such further writes to sequential addresses may not be delayed until the data sets are copied to the secondary volume because the sequential data sets may already have been copied as part of the operation to copy the data sets to sequential addresses following the target data set.

Figure 4:
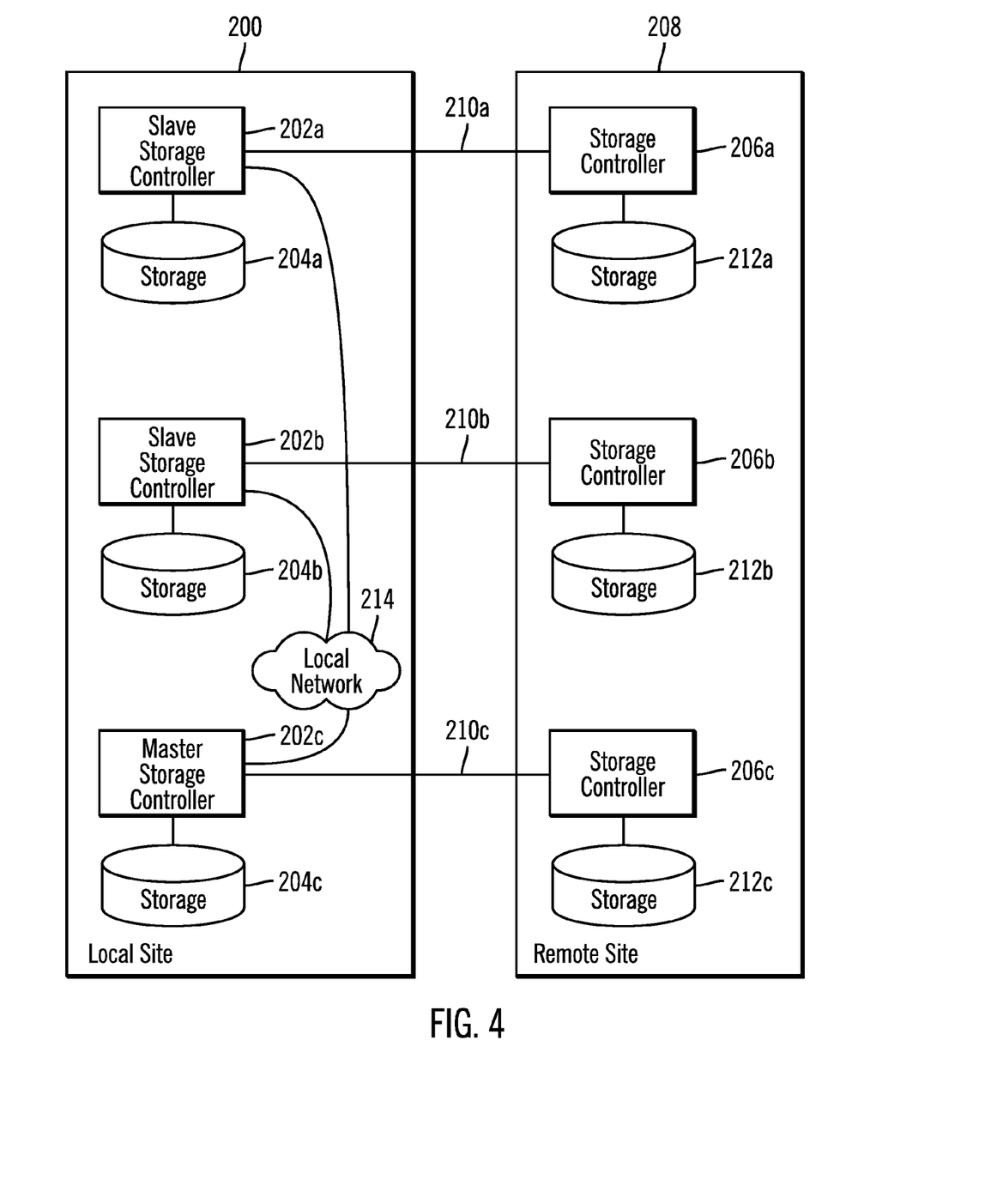
FIG. 4 illustrates an alternative embodiment of controllers at a primary site and at a remote site.

FIG. 4 illustrates an alternative embodiment, where the primary controllers at a primary site 200 are organized in a group of one master storage controller 202c and a plurality of subordinate or slave storage controllers 202a and 202b. The storage controllers 202a, 202b, and 202c manage Input/Output (I/O) access to volumes in the storage systems 204a, 204b, 204c from host systems (not shown). Each storage controller 202a, 202b, 202c at the primary site 200 copies data to a corresponding remote storage controller 206a, 206b, 206c at a remote site 208 via connections 210a, 210b, 210c. The storage controllers 202a, 202b, 202c transmit data consistent as of point-in-time to the remote storage controllers 206a, 206b, 206c, where the remote storage controllers 206a, 206b, 206c store the data to their respective attached remote storage systems 212a, 212b, 212c.

In the embodiment of FIG. 4, the master storage controller 202c may manage the operations of the slave storage controllers 202a and 202b over a local network 214 and manage the copying of data in a consistency group to the remote site 208 so that data across the different storage controllers 202a, 202b, 202c and storages 204a, 204b, 204c is managed in a same consistency group. Each controller 202a, 202b, and 202c at the primary site may include a storage manager, changing recording information, out-of-synch data information, and consistency group information as shown in FIG. 1. The master storage controller 202c may perform itself and instruct the slave storage controllers 202a, 202b to queue writes and initialize their change recording and out-of-synch data information. After the master storage controller 202c receives acknowledgment from itself and the slave storage controllers 202a, 202b that they have completed initialization of the change recording and out-of-synch data information, the master storage controller 202c initiates and instructs the slave storage controllers 202a, 202b to initiate processing writes and asynchronously copy the data sets indicated in their out-of-synch data information. The controllers 202a, 202b, 202c may each perform the operations in FIG. 3 to handle write requests and copy over determined sequential data sets when processing a write to a target data set indicated in the out-of-synch data information as not yet copied to the secondary storage 212a, 212b, 212c.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 2 and 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 5:
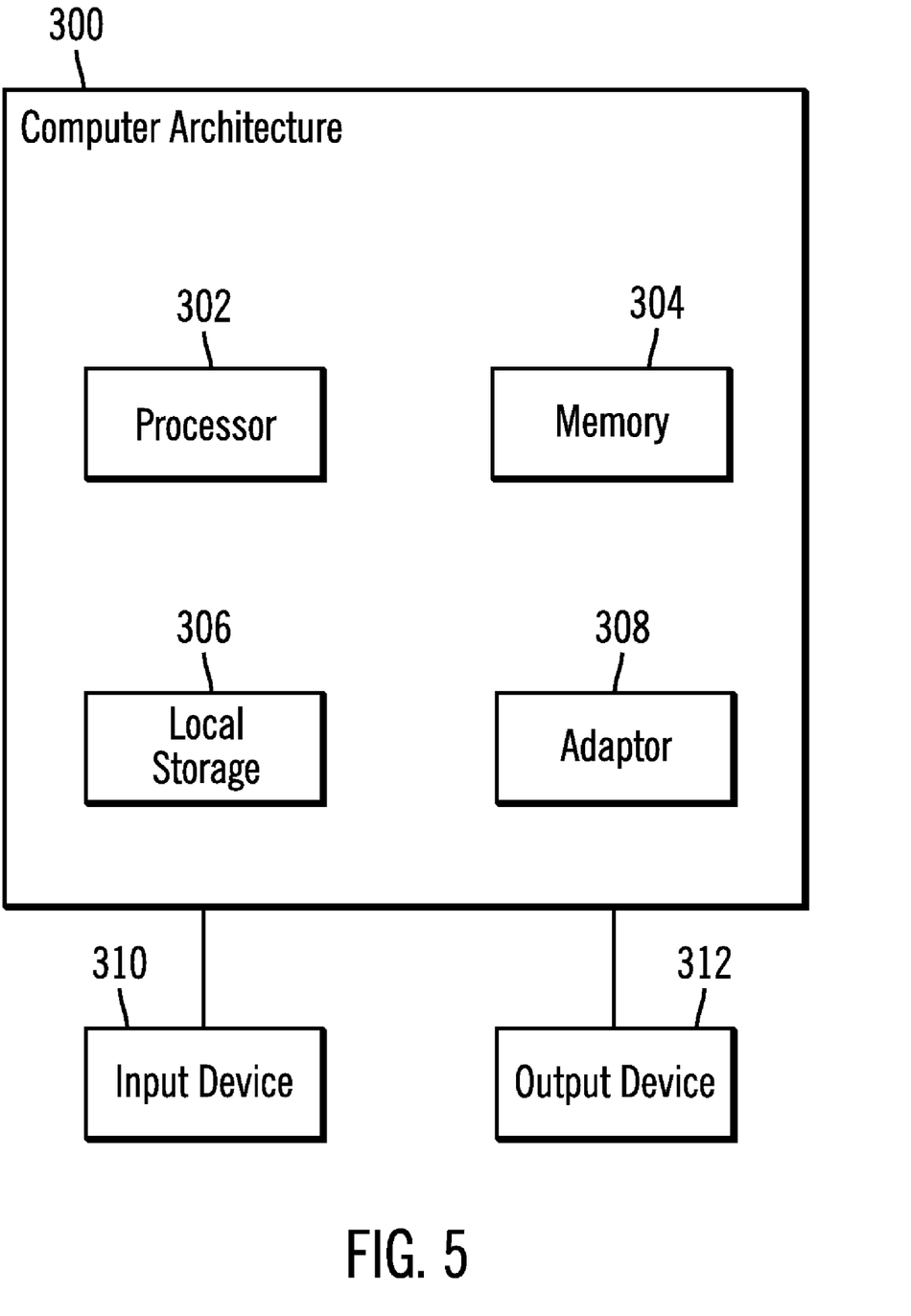
FIG. 5 illustrates a block diagram of a computer architecture in which certain described aspects of the embodiments are implemented.

FIG. 5 illustrates an embodiment of computing system architecture 300 that may be implemented, in whole or in part, in the controllers 2, 6, 202a, 202b, 202c, 206a, 206b, 206c (FIGS. 1 and 4). The architecture 300 may include one or more processors 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor(s) 302 in a manner known in the art. The architecture further includes one or more adaptors 308 to enable communication over a network. An input device 310 may be used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer readable storage medium including code to communicate with a primary storage and secondary storage and perform operations, the operations comprising:

generating information indicating data sets to copy from a primary storage to a secondary storage;

initiating a background copy operation to copy the data sets indicated in the information to the secondary storage according to an ordering indicated in the information;

receiving, after initiating the operations to copy the data sets indicated in the information, a write request to write data to a target data set indicated in the information to copy from the primary storage to the secondary storage;

copying the target data set from the primary storage to the secondary storage;

determining whether the write request is part of a sequential write access to sequential addresses in the primary storage;

copying sequential data sets following the target data set from the primary storage to the secondary storage in response to determining that the write request is part of the sequential write access, wherein the target data set and sequential data sets copied to the secondary storage are capable of being copied out of order with respect to the data sets being copied by the background copy operation according to the ordering indicated in the information;

indicating in the information the sequential data sets copied to the secondary storage as copied to the secondary storage; and executing the write request to write the data to the primary storage in response to receiving an acknowledgment that the target data set was copied to the secondary storage.

2. The computer readable storage medium of claim 1, wherein the sequential data sets following the target data set are indicated in the information.

3. The computer readable storage medium of claim 1, wherein the copying of the sequential data sets following the target data set further comprises:

determining whether a next sequential data set following a previously considered data set is indicated in the information as not yet copied, wherein the previously considered data set comprises one of the target data set or one of the sequential data sets; and copying the next sequential data set from the primary storage to the secondary storage in response to determining that the next data set is sequential with respect to the previously considered data set and indicated in the information.

4. The computer readable storage medium of claim 3, wherein a number of next sequential data sets following the target data set that are copied to the secondary storage is at most a maximum number, and wherein the continued copying of the next sequential data sets is terminated in response to determining that the next sequential data set is not indicated in the information.

5. The computer readable storage medium of claim 1, wherein the information comprises out-of-synch data information, wherein the operations further comprise:

receiving writes directed to target data sets while copying data sets indicated in the out-of-synch data information to the secondary storage; and indicating the received writes in change recording information received after establishing the out-of-synch information.

6. The computer readable storage medium of claim 1, wherein generating the information comprises instructing, by a master storage controller, slave storage controllers to create slave information indicating data sets at the slave storage controllers to copy to a secondary controller, wherein the slave storage controllers generate the slave information indicating data sets to copy to corresponding secondary storages in response to the instruction from the master storage controller to create the slave information, wherein after generating the slave information, each of the slave storage controllers performs the operations of receiving the write request, determining whether the write request is part of a sequential write access; copying the target data set and sequential data sets following the target data set from the primary storage to the corresponding secondary storage, wherein the slave storage controllers execute the write request in response to receiving acknowledgment that the target data set was copied to the corresponding secondary storage.

7. The computer readable storage medium of claim 1, wherein the operations further comprise:

for each of the sequential data sets following the target data set, determining whether the sequential data set was copied to the secondary storage in response to determining that the write is part of the sequential write access, wherein the operation of copying the sequential data sets is performed in response to determining that the sequential data sets are not yet copied to the secondary storage; and terminating the operation to copy the sequential data set without copying the sequential data set from the primary storage to the secondary storage in response to determining that the sequential data set has not yet been copied to the secondary storage.

8. The computer readable storage medium of claim 1, wherein indicating in the information the sequential data sets copied to the secondary storage indicates that the sequential data sets do not need to be copied.

9. The computer readable storage medium of claim 1, wherein the operations further comprise:

determining from the information whether the target data set was copied to the secondary storage in response to receiving the target data set to write; and executing the write request to write the target data to the primary storage in response to determining that the information indicates that the target data set was copied to the secondary storage, wherein the operations of determining whether the write request is part of a sequential write access, copying the sequential data sets, indicating in the information the sequential data sets copied, and executing the write request in response to receiving the acknowledgement are performed in response to determining that the information indicates that the target data set was not copied to the secondary storage.

10. A system in communication with a primary and secondary storages, comprising:

a controller; and a memory accessible to the controller including information indicating data sets to copy from a primary storage to a secondary storage;

code executed by the controller to perform operations, the operations comprising:

initiating a background copy operation to copy the data sets indicated in the information to the secondary storage according to an ordering indicated in the information;

receiving, after initiating the operations to copy the data sets indicated in the information, a write request to write data to a target data set indicated in the information to copy from the primary storage to the secondary storage;

copying the target data set from the primary storage to the secondary storage;

determining whether the write request is part of a sequential write access to sequential addresses in the primary storage;

copying sequential data sets following the target data set from the primary storage to the secondary storage in response to determining that the write request is part of the sequential write access, wherein the target data set and sequential data sets copied to the secondary storage are capable of being copied out of order with respect to the data sets being copied by the background copy operation according to the ordering indicated in the information;

indicating in the information the sequential data sets copied to the secondary storage as copied to the secondary storage; and executing the write request to write the data to the primary storage in response to receiving an acknowledgment that the target data set was copied to the secondary storage.

11. The system of claim 10, wherein the sequential data sets following the target data set are indicated in the information.

12. The system of claim 10, wherein the copying of the sequential data sets following the target data set further comprises:

determining whether a next sequential data set following a previously considered data set is indicated in the information as not yet copied, wherein the previously considered data set comprises one of the target data set or one of the sequential data sets; and copying the next sequential data set from the primary storage to the secondary storage in response to determining that the next data set is sequential with respect to the previously considered data set and indicated in the information.

13. The system of claim 10, wherein the information comprises out-of-synch data information, and wherein the operations further comprise:
receiving writes directed to target data sets while copying data sets indicated in the out-of-synch data information to the secondary storage; and
indicating the received writes in change recording information received after establishing the out-of-synch information.

14. The system of claim 10, wherein the controller comprises a master storage controller, further comprising:
slave storage controllers;
wherein the master storage controller generates the information by instructing the slave storage controllers to create slave information indicating data sets at the slave storage controllers to copy to a secondary controller; and
code executed by the slave storage controllers to perform operations, the operations comprising:
generating the slave information indicating data sets to copy to corresponding secondary storages in response to the instruction from the master storage controller to create the slave information, wherein after generating the slave information, each of the slave storage controllers performs the operations of receiving the write request, determining whether the write request is part of a sequential write access; copying the target data set and sequential data sets following the target data set from the primary storage to the corresponding secondary storage; and
wherein the slave storage controllers execute the write request in response to receiving acknowledgment that the target data set was copied to the corresponding secondary storage.

15. A method, comprising:
generating information indicating data sets to copy from a primary storage to a secondary storage;
initiating a background copy operation to copy the data sets indicated in the information to the secondary storage according to an ordering indicated in the information;
receiving, after initiating the operations to copy the data sets indicated in the information, a write request to write data to a target data set indicated in the information to copy from the primary storage to the secondary storage;
copying the target data set from the primary storage to the secondary storage;
determining whether the write request is part of a sequential write access to sequential addresses in the primary storage;
copying the sequential data sets following the target data set from the primary storage to the secondary storage in response to determining that the write request is part of the sequential write access, wherein the target data set and sequential data sets copied to the secondary storage are capable of being copied out of order with respect to the data sets being copied by the background copy operation according to the ordering indicated in the information;
indicating in the information the sequential data sets copied to the secondary storage as copied to the secondary storage; and
executing the write request to write the data to the primary storage in response to receiving an acknowledgment that the target data set was copied to the secondary storage.

16. The method of claim 15, wherein the sequential data sets following the target data set are indicated in the information.

17. The method of claim 15, wherein the copying of the sequential data sets following the target data set further comprises:
determining whether a next sequential data set following a previously considered data set is indicated in the information as not yet copied, wherein the previously considered data set comprises one of the target data set or one of the sequential data sets; and
copying the next sequential data set from the primary storage to the secondary storage in response to determining that the next data set is sequential with respect to the previously considered data set and indicated in the information.

18. The method of claim 15, wherein the information comprises out-of-synch data information, further comprising:
receiving writes directed to target data sets while copying data sets indicated in the out-of-synch data information to the secondary storage; and
indicating the received writes in change recording information received after establishing the out-of-synch information.

19. The method of claim 15, wherein generating the information comprises:
instructing, by a master storage controller, slave storage controllers to create slave information indicating data sets at the slave storage controllers to copy to a secondary controller; and
generating, by the slave storage controllers, the slave information indicating data sets to copy to corresponding secondary storages in response to the instruction from the master storage controller to create the slave information, wherein after generating the slave information, each of the slave storage controllers performs the operations of receiving the write request, determining whether the write request is part of a sequential write access; copying the target data set and sequential data sets following the target data set from the primary storage to the corresponding secondary storage, and wherein the slave storage controllers execute the write request in response to receiving acknowledgment that the target data set was copied to the corresponding secondary storage.

* * * * *